Oct. 7, 1947.  V. C. CRANK  2,428,556

SAW CLAMP

Filed April 23, 1945

VIRGIL C. CRANK
INVENTOR

Lester B. Clark
BY Ray L. Smith

ATTORNEYS

Patented Oct. 7, 1947

2,428,556

UNITED STATES PATENT OFFICE 2,428,556

SAW CLAMP

Virgil C. Crank, Houston, Tex.

Application April 23, 1945, Serial No. 589,745

2 Claims. (Cl. 76—78)

This invention relates to a clamping tool and more particularly to new and useful improvements in a saw clamp adapted to effectively hold a saw while sharpening or while other corrective operations are effected thereon.

The primary object of the invention is to provide a device of the class described which is simple and inexpensive to construct, and which may be readily transported to, and used at, places remote from an established shop.

Another object is to provide a saw clamp which includes elongated gripping jaws having aligned opposed gripping faces, and means for bringing such faces into engagement with a saw placed therebetween.

Still another object is to provide elongated angular gripping jaws with the edges thereof flanged in a common plane to provide enlarged gripping faces and to impart rigidity to the jaws.

A still further object is to provide a clamp that is adapted to receive a saw of indefinite length, and which therefore may be used for various types of saws such as hand saws, band saws, cross cut saws, etc.

Another object is to provide a saw clamp having one fixed gripping jaw, and a complementary opposed movable jaw with manually operable means for moving the latter to engage a saw interposed therebetween.

The foregoing objects together with additional objects will be more fully apparent from the following description taken in connection with the accompanying drawings in which.

Figure 1:
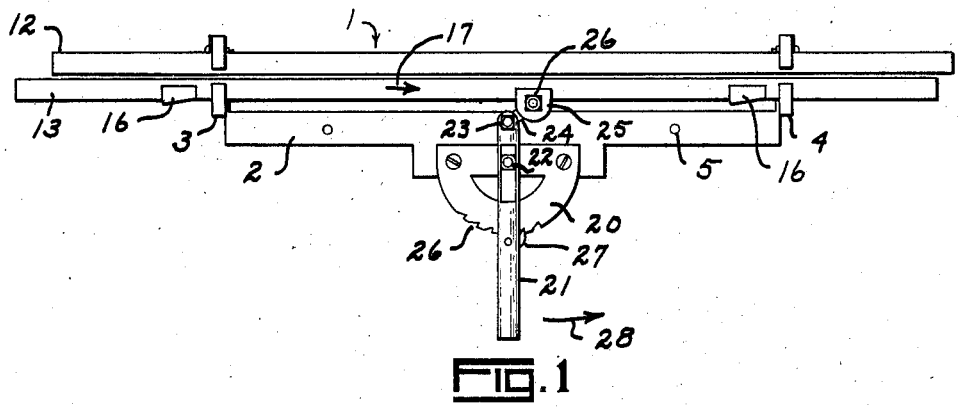
Fig. 1 is a top plan view of one embodiment of the invention.
Figure 2:
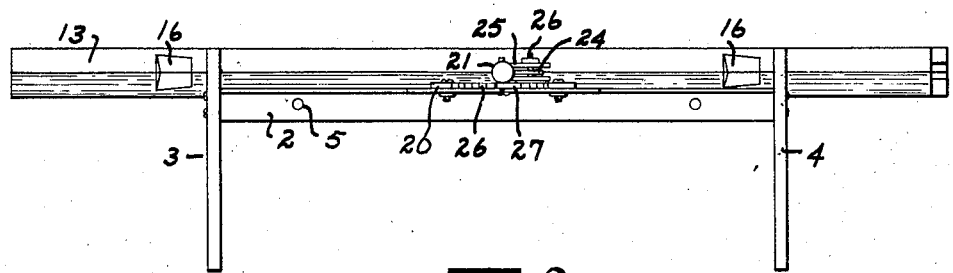
Fig. 2 is a rear elevational view of the device shown in Fig. 1.
Figure 3:
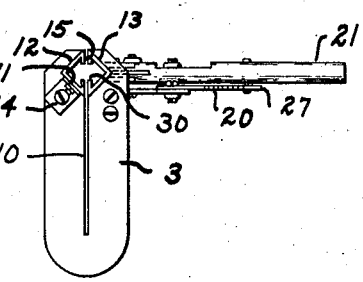
Fig. 3 is an end elevation of the device as viewed from the left in Fig. 2.

The clamp 1 is shown in the disclosed embodiment as comprising an elongated support or base member 2 having secured thereto at opposite ends spaced frame members 3 and 4. It is intended that the base member 2 shall be provided with suitable means for attaching the device to a suitable supporting structure such as a work bench. To this end a plurality of openings 5 are shown in the member 2 so that suitable fastening means such as lag screws, nails, or bolts, may be used.

The end members 3 and 4 are made of relatively heavy metal, and are provided with longitudinal slots 10 extending inwardly from one end thereof, and of sufficient width to receive the blade of a saw to be clamped in the device. The slots 10 terminate at their upper ends in a diamond shaped opening 11 which receives elongated gripping members 12 and 13. Each of the members 12 and 13 is angular in cross section, and such members are so oriented within the structure that the edges thereof are in opposed relation to provide gripping faces for a saw that is positioned within the slots 10. The member 12 is secured in place within the openings 11 as by means of brackets 14, the gripping faces 15 thereof, lying within a common plane with one side of the slots 10 in the respective members 3 and 4.

The other gripping member 13 is longitudinally slidable within the openings 11, and is provided with wedge blocks 16 mounted on its outer faces adjacent the end members 3 and 4. It seems apparent that longitudinal movement of the member 13 in the direction indicated by the arrow 17 will cause the wedges 16 to enter the openings 11 whereby the member 13 is forced toward, and into engagement with the member 12, or with a saw or other object interposed therebetween. In order to provide desired longitudinal movement of the member 13 to effect clamping and unclamping operations, a sector 20 is mounted upon the base 2, and in turn a manually operable lever 21 is pivotally mounted at 22 thereon. The inner end of this lever is pivotally connected at 23 to a link 24 which enters a recess between ears 25 on the back of the member 13. A bolt 26 passes through the ears 25 and the link 24 so that a desired connection is effected between the clamping member 13 and the lever 21.

To avoid movement of the lever 21 in a direction to effect unclamping of a saw engaged between the members 12 and 13, the periphery of the sector 20 is provided with teeth 26 which are engageable by a dog 27 mounted upon the nether side of the lever.

The clamping members 12 and 13 are of particular construction in that such members are angular in cross section and the terminii of the legs thereof are flanged at 30 so that enlarged opposed gripping faces are presented at opposite sides of the planes defined by the slots 10. Not only does this feature of construction provide enlarged gripping faces, but it also rigidifies the members 12 and 13 so that uniform clamping action is had throughout the full length of these members.

The operation of the embodiment just described is believed apparent from the foregoing description. By way of summary it will be pointed out that the clamp 1 is first suitably secured in place for use. The dog 27 is released and the arm 21 is moved as indicated by the arrow 28 so that a gap is provided between the clamping members above the slots 10 in the end or frame members 3 and 4. A saw is then lowered between the clamping members and within the slot 10 to a desired position relative to the upper surfaces of the clamping members. The lever 21 is then moved in a direction opposite to that shown by arrow 28 whereupon the wedges 16 enter the openings 11 within the end or frame members 3 and 4. Continued movement of the lever effects desired clamping action and the dog 27 is caused to enter one of the recesses 26 whereby such clamping action is maintained during the period of use of the device.

Attention is directed to the fact that, as the lever 21 is moved toward clamping position, the force exerted upon the ears 25, and in turn upon the clamping member 13 introduces a component of force directed toward the clamping member 12. Accordingly the rigidity of the members 3 and 4 maintains clamping action proximate thereto while the force exerted through the clamping lever likewise tends to maintain efficient clamping action intermediate the frame members 3 and 4.

Broadly the invention comprehends a saw clamp which is adapted to receive saw blades of unlimited length and to effectively hold such blades in a desired position that necessary operations thereon can be carried out.

What is claimed is:

1. A saw clamp comprising spaced end members, aligned saw receiving slots in said members, said slots terminating at their upper ends in jaw receiving openings, an elongated gripping jaw extending through said openings, means securing said jaw to the end members with its gripping face in the plane of the slots, a second elongated jaw extending through said openings in opposed relation to said first mentioned jaw, wedge means on the outer face of said second jaw, and means for moving said second jaw so that the wedge means enters the openings whereby the jaws engage a saw placed within the slots.

2. A saw clamp comprising a frame including end members having saw receiving slots therein, said slots terminating at their outer ends in enlarged openings through the members, opposed elongated gripping jaws extending through said openings, one of said jaws being secured within the openings having its gripping face lying substantially in the plane of the receiving slots, the other of said jaws being movable in the direction of its length and having a wedging surface on its outer face, and means for moving said other jaw longitudinally so that the wedging surface enters one of said openings and moves the jaw transversely of the slots to engage a saw positioned within the slots.

VIRGIL C. CRANK.

REFERENCES CITED

The following references are of record in the file of this patent:

UNITED STATES PATENTS

| Number | Name | Date |
| --- | --- | --- |
| 156,856 | Pond | Nov. 17, 1874 |
| 220,694 | Barrow | Oct. 21, 1879 |
| 398,031 | Covel | Feb. 19, 1889 |
| 586,359 | Holt | July 13, 1897 |
| 661,727 | Shotwell | Nov. 13, 1900 |
| 979,967 | Koeberle | Dec. 27, 1910 |
| 1,024,743 | Padrick | Apr. 30, 1912 |
| 1,028,775 | Peterson | June 4, 1912 |
| 1,196,772 | Gaede | Sept. 5, 1916 |
| 1,200,589 | Cordrey | Oct. 10, 1916 |
| 1,342,236 | Szako | June 1, 1920 |
| 1,555,584 | Juaire | Sept. 29, 1925 |
| 1,580,197 | Hargrave | Apr. 13, 1926 |
| 1,785,613 | Blumer | Dec. 16, 1930 |
| 1,867,042 | Waller | July 12, 1932 |
| 1,877,096 | Waller | Sept. 13, 1932 |
| 2,293,888 | Davis | Aug. 25, 1942 |